(12) United States Patent  (10) Patent No.: US 7,806,754 B2
Stoughton  (45) Date of Patent: Oct. 5, 2010

(54) POULTRY PRESS

(76) Inventor: Joni Stoughton, 7433 Burnet Rd., Austin, TX (US) 78757

( * ) Notice: Subject to any disclaimer, the term of this patent is extended or adjusted under 35 U.S.C. 154(b) by 232 days.

(21) Appl. No.: 11/873,887

(22) Filed: Oct. 17, 2007

(65) Prior Publication Data

US 2009/0104328 A1    Apr. 23, 2009

(51) Int. Cl.
A22C 9/00 (2006.01)
(52) U.S. Cl. ..................................... 452/141
(58) Field of Classification Search ......... 452/141–145, 452/125, 177–179, 198
See application file for complete search history.

(56) References Cited

U.S. PATENT DOCUMENTS

| 522,243 | A | | 7/1894 | Tuttle | |
|---|---|---|---|---|---|
| 673,768 | A | * | 5/1901 | Fleming | 241/236 |
| 2,135,960 | A | * | 11/1938 | Campbell | 452/142 |
| 2,243,492 | A | * | 5/1941 | Wilson | 452/142 |
| 3,414,681 | A | | 12/1968 | Manaster | |
| 3,879,157 | A | | 4/1975 | Heesen | |
| 4,437,208 | A | * | 3/1984 | Sampson | 452/142 |
| 5,114,379 | A | | 5/1992 | Prosenbauer | |
| 5,340,354 | A | * | 8/1994 | Anderson et al. | 452/142 |
| 5,429,548 | A | | 7/1995 | Long et al. | |
| 5,445,562 | A | | 8/1995 | Brunell et al. | |
| 5,468,180 | A | | 11/1995 | Jordan et al. | |
| 5,738,578 | A | * | 4/1998 | Marchese | 452/142 |
| 5,850,786 | A | * | 12/1998 | Bifulco | 100/343 |
| 7,069,840 | B1 | | 7/2006 | Howard | |

FOREIGN PATENT DOCUMENTS

FR    2756475    6/1998

* cited by examiner

*Primary Examiner*—Richard Price
(74) *Attorney, Agent, or Firm*—Matthew E. Burr

(57) ABSTRACT

An apparatus for flattening one or more cuts of poultry to prepare at least one of the cuts to be cooked may have at least one roller turner, one or more roller supports, a first roller mounted on at least one of the roller supports and adapted to be turned by the roller turner and a second roller mounted on at least one of the other roller supports. The second roller may be disposed substantially parallel to the first roller such that the distance between the first roller and the second roller is less than the size of an unflattened cut of poultry, such that the poultry is flattened when fed between the rollers with the roller turner. Various configurations of the rollers, methods of using the apparatus, and automated embodiments provide advantages for food preparation.

18 Claims, 5 Drawing Sheets

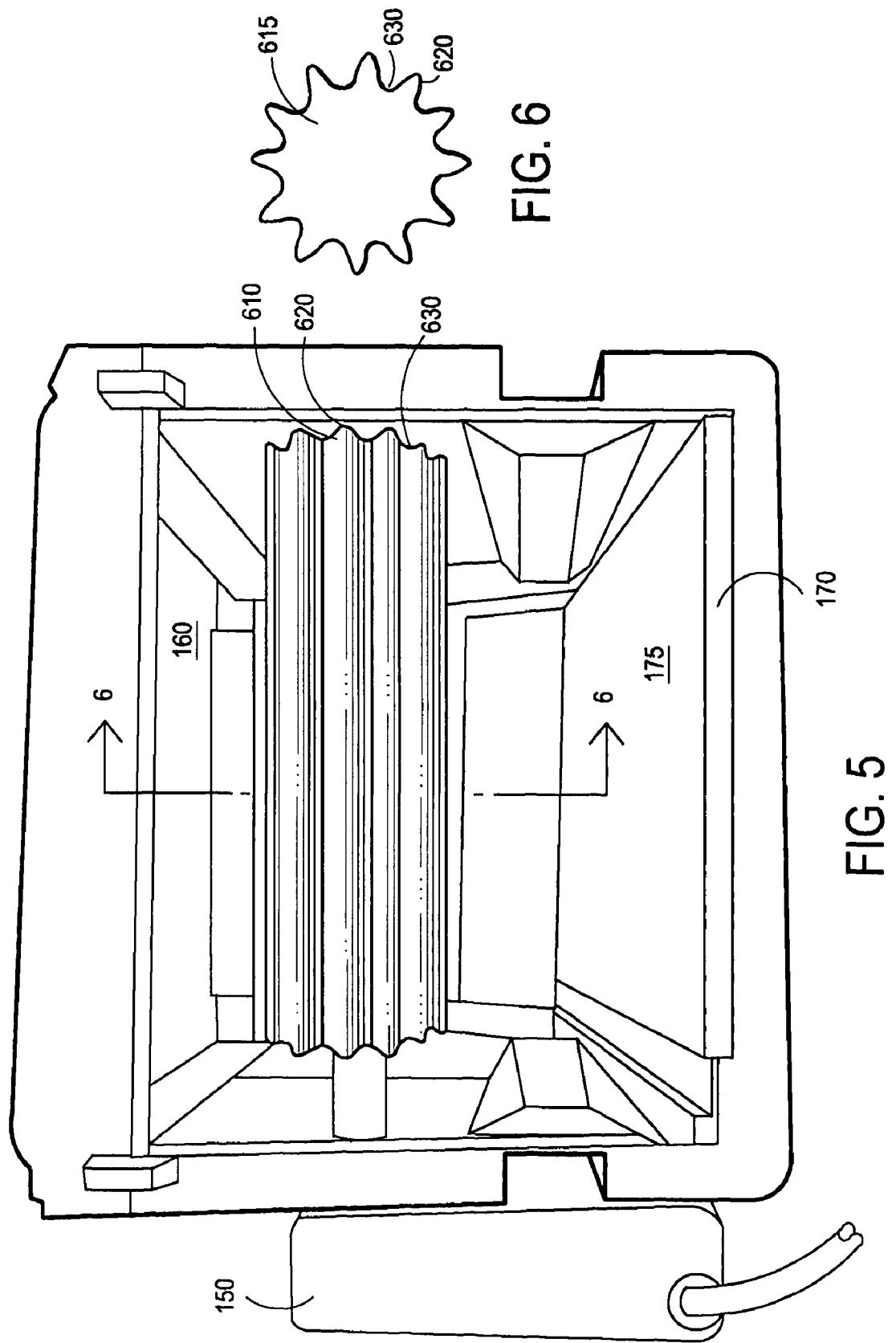

POULTRY PRESS

TECHNICAL FIELD

This disclosure relates generally to cooking tools and more particularly to a press for flattening chicken breasts and other poultry cuts.

BACKGROUND

Many poultry recipes call for a flattened breast cut. Typically, the cook wants to flatten the breast without losing too much liquid so that the meat will not be dry after cooking. The most common way to prepare a flattened poultry breast is to hammer the breast with a mallet.

Hammering has drawbacks which include damaging the poultry meat, making a mess in the kitchen, fluid or pieces of meat may fly off of the breast or the mallet creating unsanitary conditions, a cook may become tired after hammering just a few breasts for the preparation of a meal, and it may be difficult for one person to flatten more than one piece of meat at a time.

Additionally, when flattening a batch of two or more poultry breasts by hammering it is likely that the flattened height of the hammered breasts in the batch will not be uniform and may vary significantly from one breast to another, particularly if there is variation in initial heights of the breasts in the batch.

Some cooking tools for meat may use rollers as conveyors to move cuts of meat or other ingredients from one part of an apparatus or one location in a kitchen to another and so forth. Other household tools such as a mop bucket or roller wringer may provide rollers pressed together and between which the mop rag may be passed to wring the mop dry by turning one of the rollers with a hand crank attached to the roller. Generally such roller wringers keep the rollers pressed tightly together to maximize the wringing force on whatever passes between the rollers to squeeze out as much liquid as possible. Thus conveyor rollers and wringer rollers are not generally well suited for flattening chicken or other poultry breasts.

There is a need, therefore, for a press to flatten poultry breasts or other cuts in such a way as to reduce the disadvantages encountered when hammering poultry breasts with a mallet. The present disclosure describes a press that may advantageously reduce the damage done to the meat in the flattening process in comparison hammering, may reduce the mess and unsanitary conditions of the kitchen, may use less physical exertion on the part of the cook, which may be adapted to flatten more then one cut of meat at a time, and which may allow a batch of two or more poultry breasts to be flattened substantially uniformly to approximately the same height regardless of their starting height.

SUMMARY

Although the present disclosure describes a poultry press in terms of a chicken breast, it will be appreciated that a chicken breast press is merely one specific embodiment of the present disclosure. Alternative embodiments may be adapted for flattening other cuts of poultry and still be within the scope of the present disclosure. Accordingly, any reference to the chicken or breasts is merely an illustrative example and is not intend to limit the scope of this disclosure or the appended claims.

Typically the breasts or other cuts will be boneless, but the cuts of poultry meat may be boneless or still contain bones, depending on the design choice of a particular embodiment or the requirements of a particular recipe.

An apparatus is described for flattening one or more cuts of poultry to prepare at least one of the cuts to be cooked. The apparatus may have at least one roller turner, one or more roller supports, a first roller mounted on at least one of the roller supports and adapted to be turned by the roller turner, and a second roller mounted on at least one of the roller supports and disposed substantially parallel to the first roller such that the distance between the first roller and the second roller is less than the size of an unflattened cut of poultry, such that the poultry is flattened when fed between the rollers with the roller turner.

One or more of the rollers may have a variable or tapered diameter in certain embodiments of the present poultry press to accommodate the shape of many poultry breasts, which tend to be thicker in the middle than they are at the edges. Such a tapered roller may not actually turn as the breast passes through (thus may not literally be a "roller" but might bet better described a "press") rather a flexible sleeve turns around a relatively more rigid support rod as a breast passes over the sleeve in response to the turning of a second roller with the roller turner.

The roller turner may be, for example, a hand crank, but alternative embodiments may provide one or more motors such as an electric motor, to turn the roller. Typically the second roller turns passively as the meat passes between the rollers impelled by the first roller being turned by the motor or otherwise; but the present disclosure also contemplates alternative embodiments in which the second roller, or other rollers as may be selected according to engineering design choice, is also driven by a turner or motor.

Alternative embodiments may also provide a series of three or more rollers arranged on one or more supports and two or more roller turners adapted to turn two or more of the rollers such that the apparatus is adapted to flatten a plurality of poultry cuts at substantially the same time. Thus the disclosure contemplates scaled-up machines for institutional meal preparation whereby many poultry breasts may be flatten at substantially the same time. Alternatively, a press of the present disclosure may be modular in the sense that rollers and roller turners may be selectively added or removed depending on the quantity To facilitate cleaning the press, certain embodiments may provide one or more desired. rollers with a selectively removable, roller sleeve that can be removed for cleaning, even thrown in the dish washer and then slipped back over the roller when ready for use. Some embodiments of the sleeve may have a textured surface to enhance frictional contact between the sleeve and the poultry. For example, a sleeve may be plastic of rubber and have spikes, bumps or a roughened surface that engages the meat for efficient transfer of rotational force to impel the meat between the rollers.

Some embodiments may provide a selectively removable housing to house components of the press, such as, for example, at least the first and second rollers. The housing may provide one or more of the roller supports in certain embodiments. The housing may provide at least one first, opening through which to feed the poultry and at least one second opening from which to extract the flattened poultry. Specific alternative embodiments may further provide at least one selectively openable cover over at least one of the openings and or alternatively a selectively removable floor tray to facilitate extraction of the flatten breast and also for ease of cleaning the apparatus.

An adjuster connected to at least one of the rollers to adjust the distance between the first and second rollers may be provided in specific embodiments. Variation in the distance between the rollers may be obtained in certain embodiments with at least one of the rollers spring-mounted to provide play in the distance between the first and second rollers.

A method of preparing one or more cuts of poultry to be cooked may include steps such as passing at least one cut of poultry between two rollers spaced such that the poultry is flattened as it passes between the rollers to provide a flattened cut of poultry. Specific embodiments of methods of the present disclosure may include turning one of the rollers to impel the poultry between the rollers, further method embodiments may include automating the pressing of poultry breasts with the use apparatus embodiments that incorporate programmability with microprocessors and machine readable media.

BRIEF DESCRIPTION OF THE DRAWINGS

For a more complete understanding of the present disclosure, and the advantages thereof, reference is now made to the following description taken in conjunction with the accompanying drawings, in which:

FIG. 5 is a front side perspective view of another specific alternative embodiment of a poultry press of the present disclosure.

FIG. 6 is a cross section of a roller of FIG. 5 along line 6-6 of the present disclosure.

DETAILED DESCRIPTION

Figure 1:
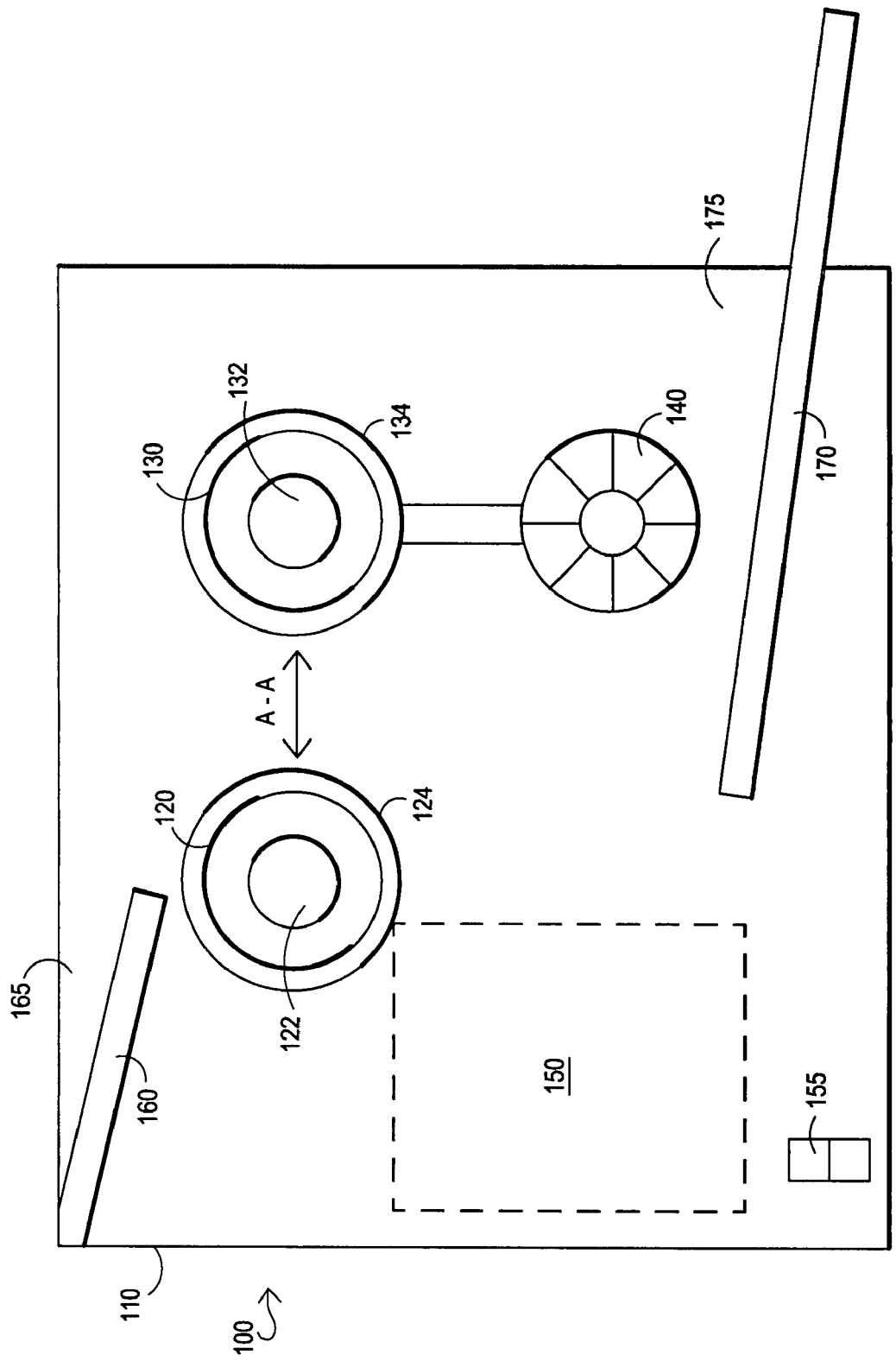
FIG. 1 is side view cross section of a specific embodiment of a poultry press of the present disclosure.

FIG. 1 is side view cross section of a specific embodiment of a poultry press of the present disclosure. Referring to FIG. 1 of the drawings, the reference numeral 100 generally designates a poultry breast press apparatus embodying features of the present disclosure. The apparatus 100 includes housing 110 for first roller 120 second roller 130 at a distance A-A from first roller 120, dial 140 to adjust distance A-A between roller 120 and second roller 130, and turner 150 in rotational communication with first roller 120 to turn roller 120. Distance A-A between rollers 120, 130 maybe set to be less than the thickness of an unflattened poultry breast so that the unflattened breast is flattened relative to its unflattened state when the breast passes between rollers 120, 130.

For embodiments in which turner 150 is a motor, on/off switch 155 is conveniently located on housing 110 to selectively activate of deactivate turner 150. Specific embodiments of housing 110 may have one or more doors or other suitable openings to allow access the rollers, trays and so forth for cleaning, replacement, maintenance and the like.

In specific embodiments rollers 120, 130 are mounted directly onto housing 110 and rollers 120, 130 may be selectively removable from such housing mounts for cleaning, replacement, maintenance and so forth. Alternative embodiments provide roller mounts interior to housing 110 to which roller may be mounted. Such interior mounts for example, may allow an assembly of rollers to be selectively removed from housing 110. The present disclosure contemplates that rollers may be selectively removable and replaceable. For example, rollers adapted for pressing chicken breasts may be replaced with rollers adapted for turkey breasts, or flat rollers may be selectively replaced with contoured or shaped rollers.

Plate or tray 160 at top opening 165 of apparatus 100 maybe selectively removable and is preferably disposed at a downward incline to facilitate insertion of a poultry breast between Roller 120, 130. Plate or tray 170 at exit opening 175 maybe selectively removable for ease of cleaning.

First roller 120 may be mounted on axle 122 which is rotated by turner 150. Specific embodiments provide selectively removable sleeve 124 disposed around first roller 120. Sleeve 124 protects roller 120 and may be removed for cleaning.

Poultry breasts are frequently wet and slippery and so may not get traction on roller 120. Accordingly, sleeve 124 is preferably textured so that a poultry breast passing over roller 120 may gain purchase on the surface of roller 120 and be impelled between rollers 120, 130 from the rotation of roller 120 caused by turner 150.

Second roller 130 may be mounted on axle 132 which turns passively as a poultry breast passes between rollers 120, 130. Specific embodiments provide selectively removable sleeve 134 disposed around second roller 130. Sleeve 134 protects roller 130 and may be removed for cleaning. Preferably, sleeve 134 has a textured surface like sleeve 124 so that a poultry breast can get traction on the rollers and be impelled toward exit opening 175.

Sleeves 124 and 134 are attached in particular embodiments to rollers 120, 130 respectively so that the sleeves rotate substantially as the rollers rotate so that the sleeve does not substantially slip on its respective roller during rotation.

Figure 2:
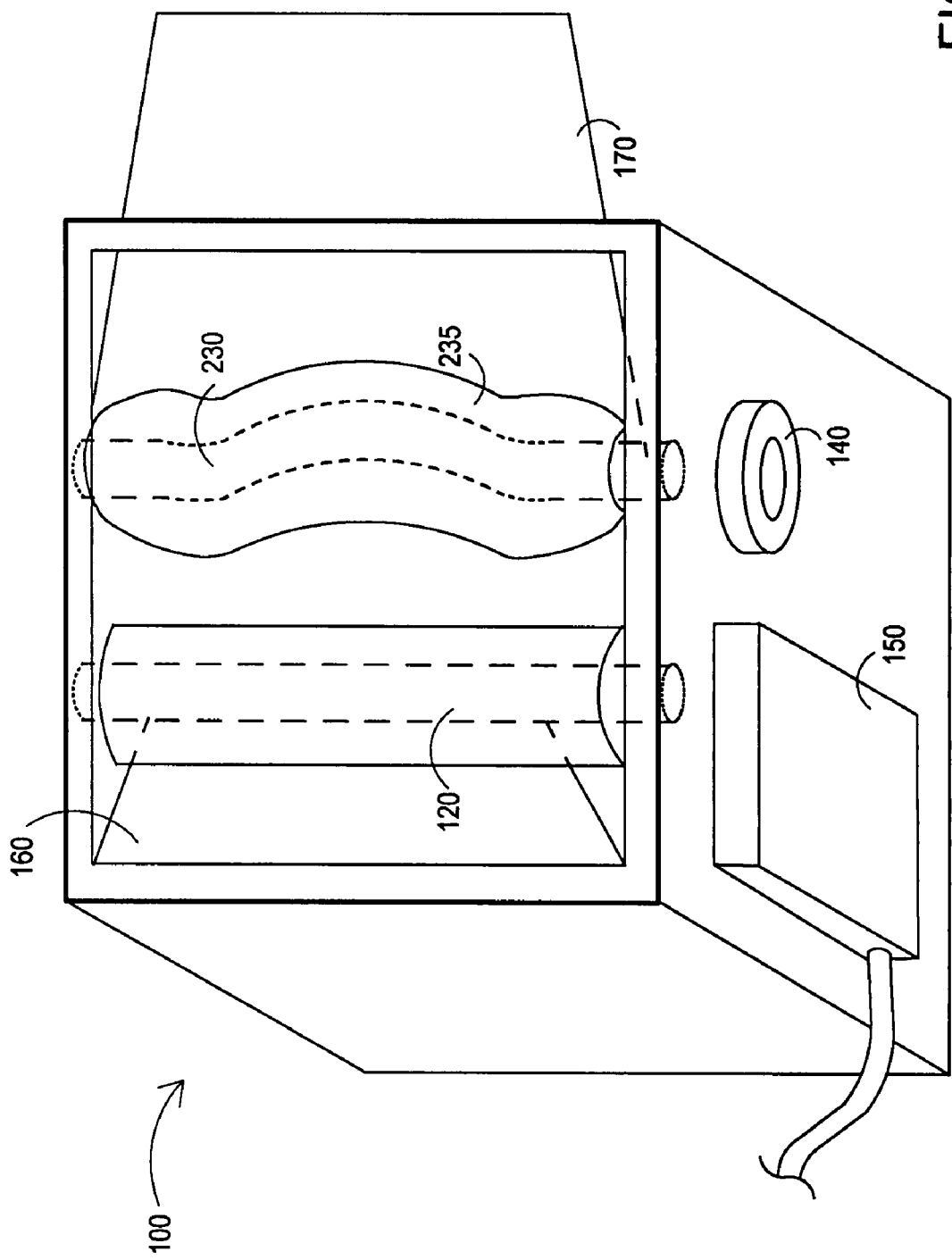
FIG. 2 is a top perspective view of a specific embodiment of a poultry press of the present disclosure.

FIG. 2 is a top view, isometric perspective view of a specifics alternative embodiment of a poultry press of the present disclosure. A specific alternative embodiment of apparatus 100 provides press 230 which is shaped to accommodate the tapered shape of a typical poultry breast. First roller 120 operates as described above, but press 230 does not passively rotate as described above for second roller 126. Instead, press 230 remains substantially fixed in position, while sleeve 235 around press 230 rotational slides around press 230 as a poultry breast passes between roller 120 and press 230.

Figure 3:
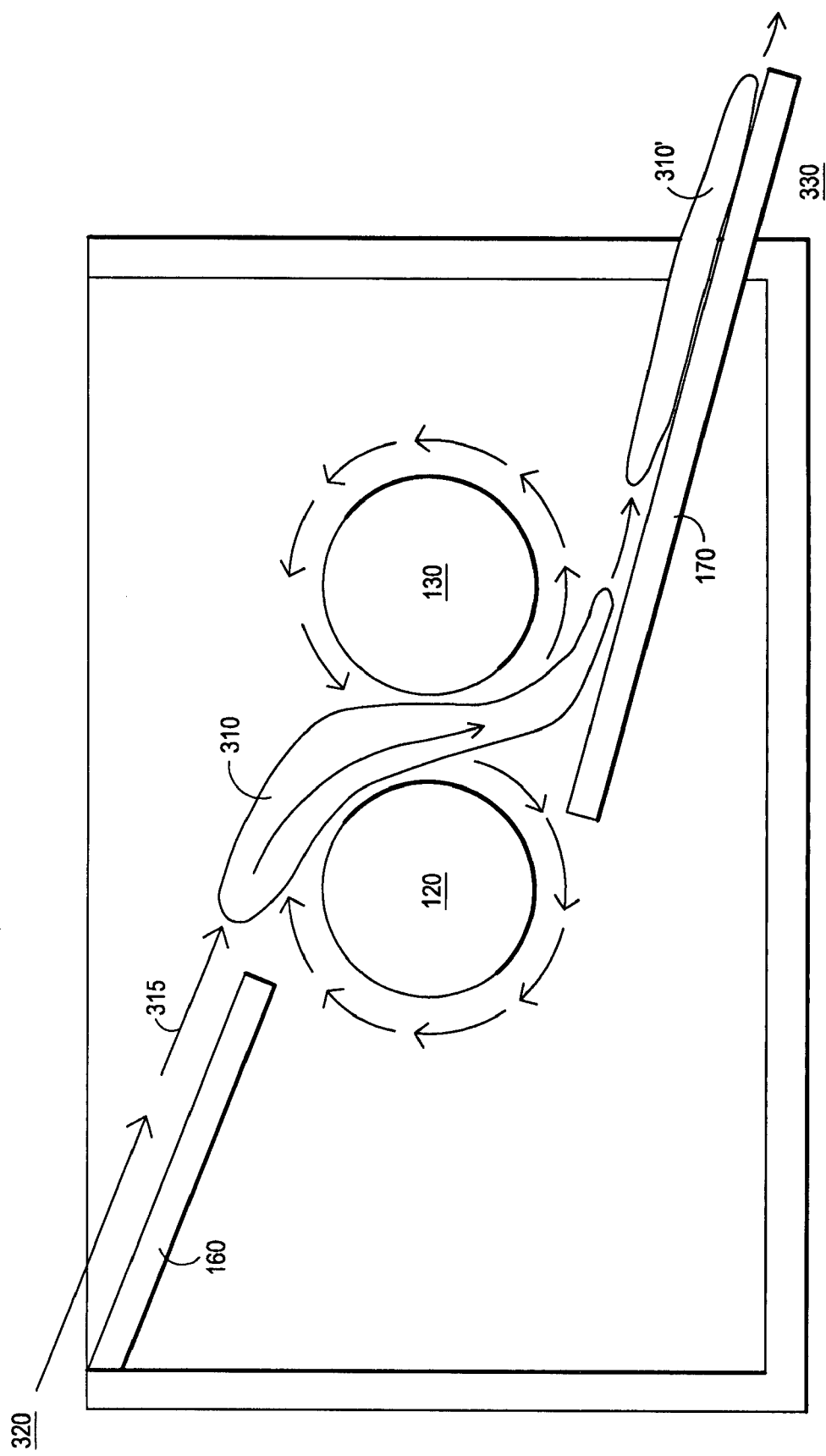
FIG. 3 is a diagrammatic illustration of a specific embodiment of a process of the present disclosure for flattening a breast of poultry.

FIG. 3 is a diagrammatic illustration of a specific embodiment of a process of the present disclosure for flattening a breast of poultry. Breast 310 passes between rollers 120, 130 in the direction shown by directional arrows 315 from start position 320 down tray 160 and out to exit tray 170. Breast 310 is pressed flat by mechanical force as it is squeezes between rollers 120, 130 and emerges relatively flattened as breast 310. Since the distance between roller 120 and roller 130 (see FIG. 1, distance A-A) may be substantially fixed in specific embodiments, the height of breast 310 is substantially uniform for each breast that passes through the press, regardless of the height of breast 310 before it passes through rollers 120, 130. Thus, a press of the present disclosure may produce a batch of two or more breasts with substantially or approximately uniform flattened height, particularly in comparison to the poor uniformity of flattened height that could be achieved by hammering.

Figure 4:
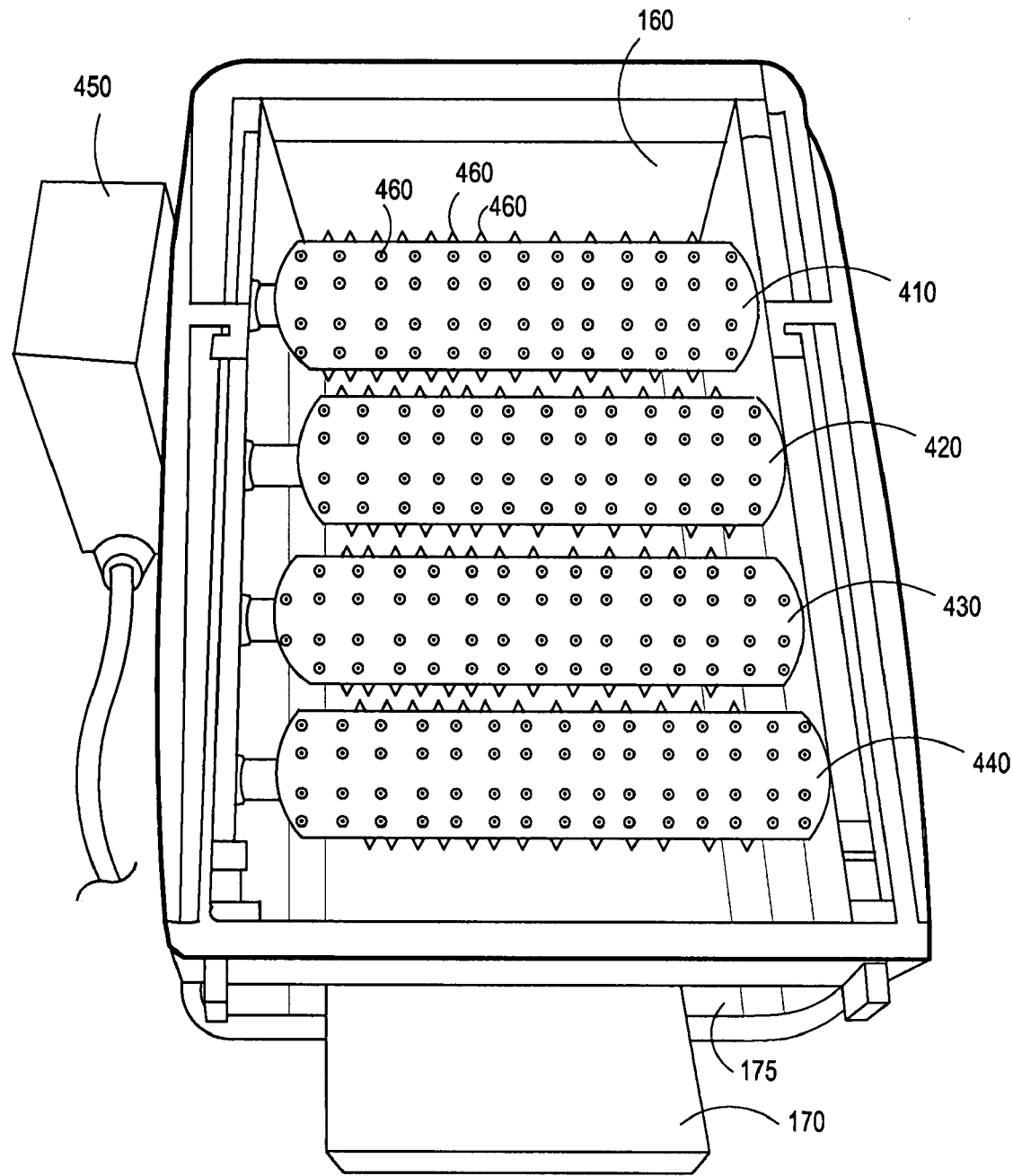
FIG. 4 is a top perspective view of a specific alternative embodiment of a poultry press of the present disclosure.

FIG. 4 is a top perspective view of a specific alternative embodiment of a poultry press of the present disclosure. Having described herein the basic components of an apparatus and method for flattening a poultry breast, those skilled in the art will recognize that the roller press mechanism of the present disclosure may be scaled up to provide breast pressing machinery for processing poultry breasts on a large scale for hotel and convention hall kitchens that prepare dozens or even hundreds of meals a day, or even to an industrial scale for processing breasts for fast food chicken tenders and the like for national or global restaurant chains.

Accordingly, FIG. 4 illustrates a scaled up embodiment of a poultry press of the present disclosure having a plurality of rollers 410, 420, 430, 440 in series to receive and flatten more than one poultry breast at time. One or more of rollers 410, 420, 430, 440 may be turned by motor 450. For example, rollers 410 and 430 may be turned by a motor 450 while rollers 420 and 440 turn passively as a poultry breast passes over them. Poultry breasts may be fed into the apparatus via top opening 160 and may exit the apparatus after flattening via exit opening 175 as described above. Texturizing features 460 are disposed around rollers 410 through 440 to provide a textured roller surface for enhanced traction of the poultry on the rollers.

FIG. 5 is a front side perspective view of another specific alternative embodiment of a poultry press of the present disclosure. Roller 610 may be shaped with ridges 620 and grooves 630, for example, or other textured surface to facilitate poultry gripping during flattening. Alternative embodiments of a press of FIG. 5 may dispense with the roller sleeves described above for other embodiments. (See FIG. 1, element 134) so that roller 610 grips the cut of poultry meat directly.

FIG. 6 is a cross section 615 of a roller of FIG. 5 along line 6-6 of the present disclosure. Ridges 620 and grooves 630 create a corrugated-type surface around the roller to enhance traction on slippery cuts of poultry meat.

A roller press of the present disclosure may be automated with the incorporation on computer processor chips that may be programmed, for example, to automatically adjust the distance between the rollers depending on the size or species of the breast to be processed. For example, turkey breasts may call for a different roller distance setting than would a chicken breast, and the distance could be set automatically by an automated system of the present invention. Alternative embodiments of an automated system may include sensors, motors and microprocessors that automatically detect the size, weight or other useful measurements and adjust the force applied by the rollers to each individual breast as it passes through so that each breast is flatten to substantially the same thickness.

Automated and programmable embodiments a breast press apparatus of the present disclosure may be programmed remotely via for example, a wireless communication network or through a website on the World Wide Web and communicated to the apparatus via the Internet or other suitable network. Such programmable embodiments may provide, for example, a microprocessor in communication with the roller turner and having machine readable instructions to automate operation of the apparatus.

Accordingly, in addition to the foregoing embodiments, further alternative embodiments may provide programs or other machine readable instructions stored, on a machine readable medium, such as a microprocessor, to program computers and operate or automate the operation of devices according to the principles of the present disclosure. Machine readable media include, but are not limited to magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate, in the foregoing exemplary types of machine readable media and any combinations thereof. The programs and applications stored or the machine readable media in turn include one or more machine executable instructions which are read by the various devices and executed. Each of these instructions causes the executing device to perform the functions coded or otherwise documented in it. Of course, the programs can take many different forms such as applications, operating systems. Perl scripts, JAVA applets, C programs, compilable (or compiled) programs, interpretable (or interpreted) programs, natural language programs, assembly language programs higher order programs, embedded programs, and many other existing and future forms which provide similar functionality as the foregoing examples, and any combinations thereof.

The use of an apparatus or method of the present disclosure may provide many advantages including flattening a poultry breast or other cut in such a way as to reduce the disadvantages of hammering the breast with a mallet. The present disclosure describes a press that may advantageously reduce the damage done to the meat in the flattening process in comparison to hammering. A press of the present disclosure may advantageously be adapted to flatten more then one cut of meat at a time. A further advantage is that a batch of two or more poultry breasts may be flattened substantially uniformly to approximately the same height regardless of their starting height.

Another advantage is that a press of the present disclosure may reduce the mess and unsanitary conditions of the kitchen. Yet another advantage is that a press of the present disclosure may demand less physical exertion on the part of the cook in the preparation of poultry.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein they are used in a generic and descriptive sense only and not for purposes of limitation.

What is claimed is:

1. An apparatus for flattening one or more cuts of poultry to prepare at least one of the cuts to be cooked, the apparatus comprising:
   at least one roller turner;
   two or more roller mounts;
   a roller mounted on at least one of the roller mounts and adapted to be turned by the roller turner; and
   a press mounted on at least one of the roller mounts so that the press does not rotate and is disposed substantially parallel to the roller such that the distance between the roller and the press is less than the size of an unflattened cut of poultry, and wherein the press further comprises a tapered shape to substantially conform to the tapered shape of a typical poultry breast; and
   a selectively removable sleeve rotatably disposed around the press, such that the sleeve turns around the press as the poultry breast is fed between the roller and the press with the roller whereby the poultry breast is at least partially flattened.

2. The apparatus of claim 1, wherein the roller turner comprises a hand crank.

3. The apparatus of claim 1, wherein the roller turner comprises a motor.

4. The apparatus of claim 3, further comprising a microprocessor in communication with the roller turner, the microprocessor having machine readable instructions to automate operation of the apparatus, the microprocessor further capable of communication with the Internet so that automated operations are selectively controlled via a network.

5. The apparatus of claim 1, further comprising a plurality of pairs of rollers and presses arranged on mounts such that the apparatus is adapted to flatten a plurality of poultry breasts at substantially the same time.

6. The apparatus of claim 5, further comprising two or more roller turners adapted to turn two or more of the rollers.

7. The apparatus of claim 1, further comprising one or more selectively removable roller sleeves disposed over one or more roller.

8. The apparatus of claim 7, wherein at least one of the roller sleeves comprises a surface texture to enhance frictional contact between the sleeve and the poultry.

9. The apparatus of claim 1, further comprising a housing to house at least one roller, the press and the mounts.

10. The apparatus of claim 9, wherein the housing is selectively removable to facilitate cleaning.

11. The apparatus of claim 9, wherein the housing further comprises one or more roller supports.

12. The apparatus of claim 9, the housing further comprising at least one first opening through which to feed the poultry and at least one second opening through which to extract the flattened poultry.

13. The apparatus of claim 12, further comprising at least one selectively openable cover over at least one of the openings.

14. The apparatus of claim 9, the housing further comprising a selectively removable floor tray to facilitate cleaning.

15. The apparatus of claim 1, further comprising an adjuster connected to the roller to adjust the distance between the roller and the press.

16. The apparatus of claim 1, wherein the roller is spring-mounted to provide play in the distance between the roller and the press.

17. A poultry breast press apparatus comprising:
one or more motors;
one or more roller mounts;
at least one roller mounted on one of the roller mounts and connected to the motor;
at least one press substantially parallel to the first roller mounted on one of the roller mounts, wherein the press further comprises a tapered shape to substantially conform to the tapered shape of a typical poultry breast;
a textured selectively removable sleeve around at least one press;
a selectively removable housing for the rollers and the presses, the housing having a entry opening to pass the poultry breast for flattening between the rollers and an exit opening to remove flattened poultry breast from the press; and
a microprocessor in communication with at least one motor, the microprocessor having machine readable instructions to automate operation of the apparatus, the microprocessor also capable of communication with the Internet to automate the poultry press via a network.

18. An apparatus for flattening one or more cuts of poultry to prepare at least one of the cuts to be cooked, the apparatus comprising:
at least one roller turner;
one or more roller mounts;
a first roller mounted on at least one of the roller mounts and adapted to be turned by the roller turner;
a second roller mounted on at least one of the roller mounts and disposed substantially parallel to the first roller such that the distance between the first roller and the second roller is less than the size of an unflattened cut of poultry, such that the poultry cut is flattened when fed between the rollers with the roller turner; and
a microprocessor in communication with the roller turner, the microprocessor having machine readable instructions to automate operation of the apparatus, the microprocessor being capable of communication with the Internet to automate the poultry press via a network.

* * * * *